US005091733A

United States Patent [19]

Labruyere

[11] Patent Number: 5,091,733

[45] Date of Patent: Feb. 25, 1992

[54] ANTENNA POINTING DEVICE

[75] Inventor: Gilles Labruyere, Oegstgeest, Denmark

[73] Assignee: Agence Spatiale Europeenne, France

[21] Appl. No.: 499,774

[22] Filed: Mar. 27, 1990

[30] Foreign Application Priority Data

Apr. 18, 1989 [FR] France ............................... 89 05105

[51] Int. Cl.[5] .......................... H01Q 3/20; H01Q 3/12; H01Q 3/2; B25J 11/00

[52] U.S. Cl. .................................... 343/882; 343/761; 901/15

[58] Field of Search .................. 248/282, 674; 901/21, 901/24, 15; 414/744.5; 343/757, 759, 761, 766, 878, 880, 882, 883, 881

[56] References Cited

U.S. PATENT DOCUMENTS

| | | | |
|---|---|---|---|
| 4,550,319 | 10/1985 | Ganssle et al. | 343/882 |
| 4,766,775 | 8/1988 | Hodge | 901/15 |
| 4,787,813 | 11/1988 | Stevens et al. | 414/744.5 |
| 4,790,718 | 12/1988 | Vickers | 414/735 |
| 4,821,047 | 4/1989 | Williams | 343/766 |
| 4,946,337 | 8/1990 | Tonai et al. | 901/21 |
| 4,973,215 | 11/1990 | Karlen et al. | 901/15 |

FOREIGN PATENT DOCUMENTS

| | | | |
|---|---|---|---|
| 8707199 | 12/1987 | Japan | 901/21 |

OTHER PUBLICATIONS

Connolly et al., Differential Mount Enhances EHF Antenna Design, Defense Electronics, 9/85, pp. 87-93.

*Primary Examiner*—Michael C. Wimer
*Assistant Examiner*—Peter Toby Brown
*Attorney, Agent, or Firm*—Andrus, Sceales, Starke & Sawall

[57] ABSTRACT

An articulated device to be used for pointing satellite antennas, especially of data relay or like telecommunication satellites. It comprises at least three articulations rotatable about their respective axes coupled in pairs by arms. These rotation axes intersect at a remote virtual rotation center coinciding with the antenna's focus. The device allows pointing of an antenna by moving its reflector, while maintaining the antenna feed at its focus, thus avoiding antenna radiation pattern distortion.

15 Claims, 5 Drawing Sheets

ANTENNA POINTING DEVICE

BACKGROUND OF THE INVENTION

1. Field of the invention

The present invention concerns an articulated device applicable in particular to the pointing of a directional antenna of a satellite.

The invention is also directed to a telecommunication satellite, in particular a data relay satellite, equipped with an articulated device of this kind.

The invention is also directed to an antenna pointing method using an articulated device of this kind.

2. Description of the prior art

Telecommunication satellites in general and data relay satellites in particular generally have parabolic antennas that are directional and which must be isolated from movements of the satellite during attitude and orbit correction maneuvers. In the case of data relay, it is necessary to direct the antenna towards mobile targets on the earth or in low orbit around the earth. These isolation and pointing functions are routinely implemented by a mechanism with two degrees of freedom referred to hereinafter as an antenna pointing mechanism.

There are two known ways to point the beam of a transmit antenna installed on a satellite. As an antenna primarily comprises at least one feed, a reflector and a support structure for these members, the first way is to point the antenna as a whole, that is to say the feed, the reflector and the support structure. The second way is to move only the reflector, so as to point the radiation from the feed reflected by the reflector.

The first solution has the disadvantages of a large mass, a large volume and a large inertia to be displaced and also requires radio frequency signals to be guided through the antenna pointing mechanism, which can be complex to achieve. The second solution is simpler and used more often but it leads to distortion of the radiation pattern of the antenna because of modification of the relative positions of the feed and the reflector. The feed does not remain at the focus of the antenna reflector.

An object of the present invention is to solve these problems and to propose a new pointing mechanism, adapted in particular to point a satellite antenna, which is of the articulated device type and provides at least two possibilities of rotation about a virtual rotation center remote from the articulated device, without alteration to the geometry of the antenna.

SUMMARY OF THE INVENTION

In one aspect, the invention comprises in an articulated device comprising at least three rotary articulations coupled in pairs by arms, their rotation axes intersecting at a remote virtual rotation center.

According to another characteristic of the invention, the angle between the axes of the first and second articulations and the angle between the axes of the second and third articulations are the same.

According to a further and advantageous characteristic of the invention, said arms are bent at their center and are pivotally mounted at each end to be able to pivot through 360°.

Another object of the invention is to propose a telecommunication satellite having at least one main parabolic antenna reflector adapted to make at least two separate rotations about its focus, rotation about the axis of the paraboloid being excluded.

In another aspect, the invention consists in a telecommunication satellite, in particular a data relay or like satellite, having at least one parabolic antenna and equipped with an articulated device as defined hereinabove, said articulated device supporting said reflector.

According to an advantageous characteristic of the invention the articulated device further comprises:

a first pulley wheel fixed on the axis of the first articulation, second and third pulley wheels rotatable about the axis of the second articulation and fastened together, and a fourth pulley wheel rotatable about the axis of the third articulation and fastened to a terminal part of the device, said pulley wheels being coupled and coordinated in pairs by two non-crossed cables.

A further object of the invention is to provide an antenna pointing method for a telecommunication satellite having at least one antenna reflector allowing control of the direction of polarization of the antenna when the antenna reflector is polarized.

In a further aspect, the invention consists in an antenna pointing method for a telecommunication satellite equipped with an articulated device as defined hereinabove and wherein:

the first two articulations have respective angles of rotation to procure pointing in a given direction, and the third articulation has an angle of rotation equal and opposite to the angle of rotation of the first articulation. Other characteristics and advantages of the invention will emerge from the following description and the appended drawings which are given by way of non-limiting examples only.

DETAILED DESCRIPTION OF THE INVENTION

Figure 1:
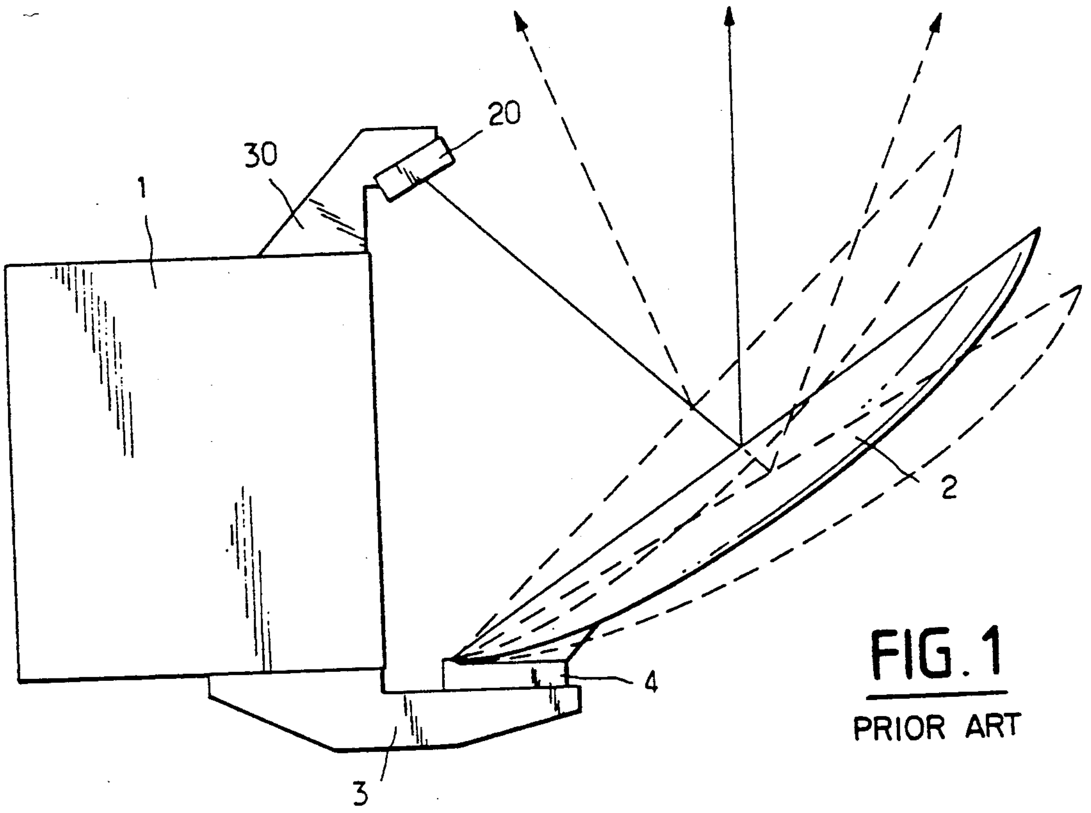
FIG. 1 PRIOR ART
FIG. 1 is a schematic representation of a satellite equipped with a parabolic reflector antenna.

FIG. 1 shows a conventional telecommunication satellite 1 equipped with an antenna comprising a radio frequency feed 20, a feed support structure 30, a parabolic reflector 2, an antenna pointing mechanism 4 and a reflector support structure 3. As can be seen in FIG. 1, the movements imparted to the reflector 2 by the antenna pointing mechanism 4 are simple pivoting movements. The various positions of the antenna reflector are shown in dashed outline. Pointing the antenna consists in deflecting the radio waves radiated by the feed 20 by inclination of the reflector 2 relative to the feed, which deflects the radio waves in a giver: direction. However, the fact that the feed does not remain at the focus of the reflector paraboloid, as can be seen in FIG. 1, results in distortion of the radiation pattern of the antenna.

The invention, as will be described, makes it possible to preserve the relative position of the source 20 and the reflector 2 irrespective of any movement applied to the satellite 1 during attitude and orbit correction maneuvers, so as to preserve intact the geometry of the antenna and therefore its radiation pattern.

Figure 2:
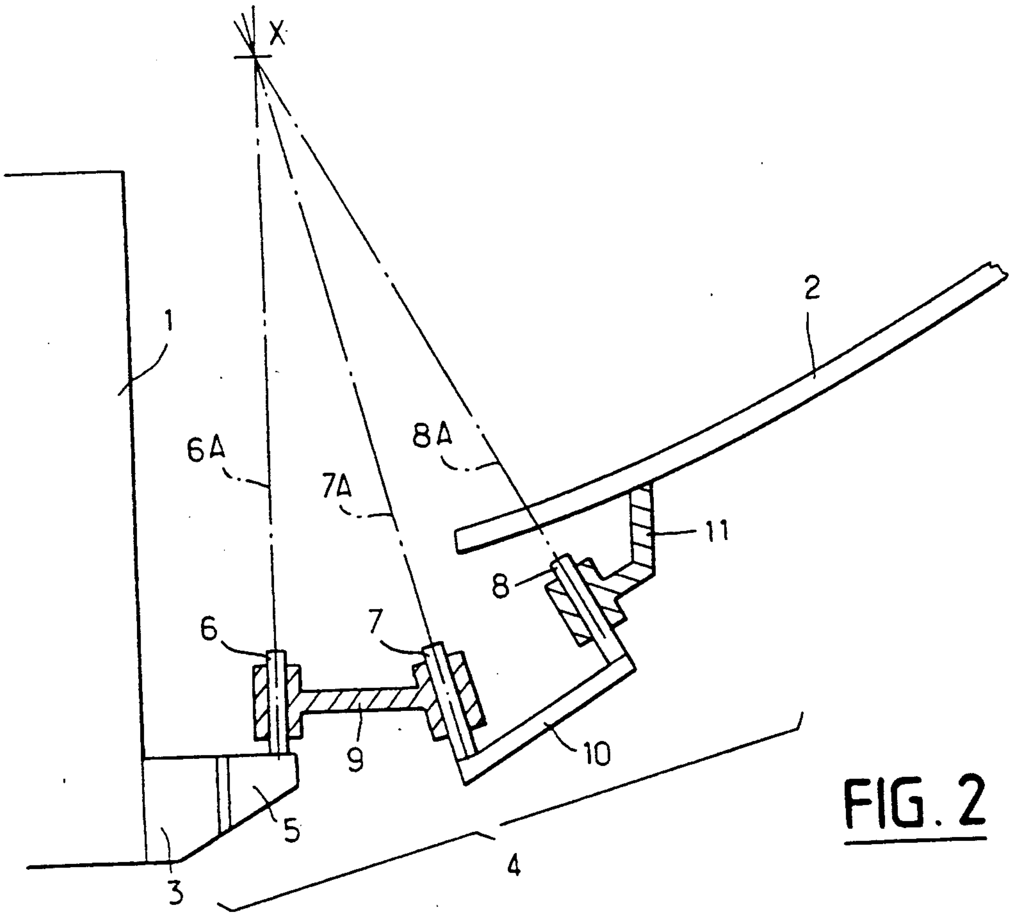
FIG. 2 is a schematic representation of the articulated device in accordance with the invention.

FIG. 2 shows an articulated device 4 in accordance with the invention suitable for use as an antenna pointing mechanism. The articulated device 4 comprises three articulations 6, 7, 8 coupled in pairs by arms 9, 10 and extended by a terminal part Il. The articulated device 4 is fixed by its first articulation 6 to a reflector support 3. The terminal part 11 supports a parabolic antenna reflector 2.

The three articulations 6, 7, 8 have respective rotation axes 6A, 7A, 8A. A virtual rotation center X of the articulated device 4 is defined at, for example, the focus of the paraboloid of the antenna reflector 2. The three axes 6A, 7A, 8A preferably intersect at the virtual rotation center X remote from the antenna reflector 2 so that it is possible to apply at least two rotations of the reflector 2 in different planes relative to its focus.

A first end of the arm 9 pivots about the axis 6A of the articulation 6. The arm 10 is linked to the arm 9 by the articulation 7 which is at the second end of the arm 9 and at the first end of the arm 10 and pivots about the axis 7A. The terminal part 11 is coupled to the second arm 10 by means of the articulation 8 which is at the second end of the arm 10 and at the first end of the terminal part 11 and pivots about the axis 8A.

For reasons concerned with its simplicity, mass and overall dimensions, the articulated device must be placed close to the reflector. As can be seen in FIG. 2, in the extended position of the articulated device, the rotation axes 6A, 7A, 8A of the three articulations 6, 7, 8 are coplanar and all pass through the virtual rotation center. The rotation axes of two consecutive articulations are not parallel and are at an angle to each other. Whatever the angle of rotation of each articulation, their axes continue to intersect at the virtual rotation center. Consequently, the terminal part 11 to which the antenna reflector is fixed has three degrees of freedom in rotation relative to the virtual rotation center at the focus of the antenna reflector.

Figure 3B:
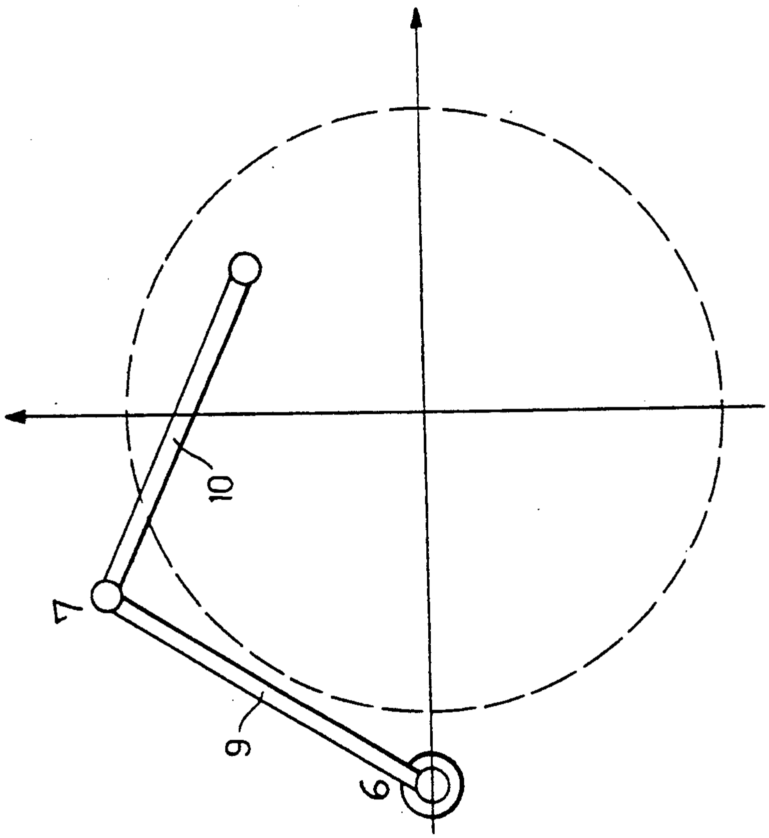
FIG. 3*b* shows a second position of the articulated device with reference to an antenna reflector pointing direction.
Figure 3A:
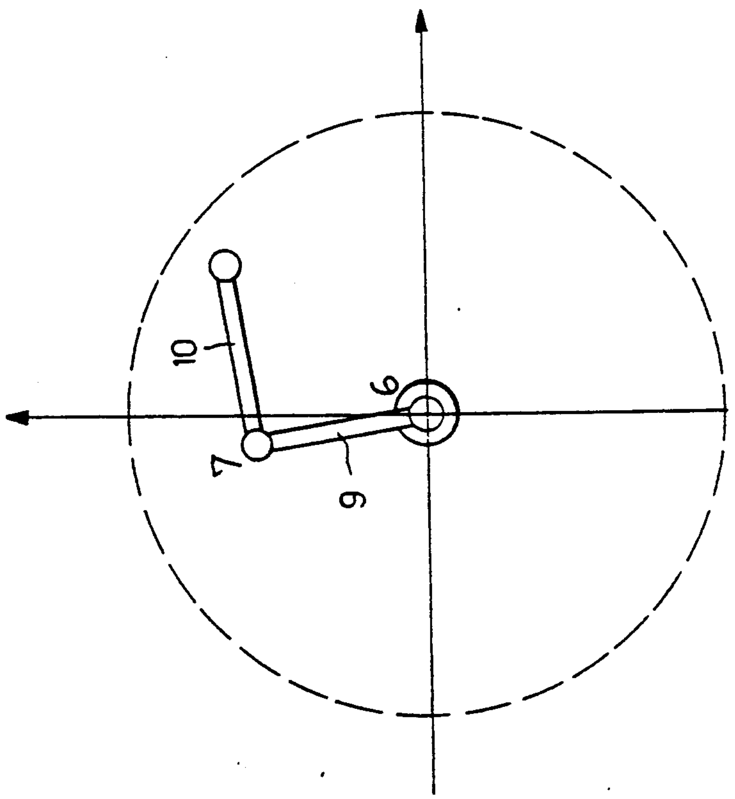
FIG. 3*a* slows a first position of the articulated device in accordance with the invention relative to an antenna reflector pointing direction.

There are two ways to point the radio beam from a satellite antenna with the first two articulations 6, 7 as previously described. A first way shown in FIG. 3*a* consists in centering the first articulation 6 and in particular its rotation axis 6A on the mean pointing direction corresponding to a central point of a plane substantially defining the coverage zone of the antenna. This first solution yields a more compact, lighter and more precise mechanism but one in which the articulations must be able to rotate through 360 . The central point is a singular point and the speeds are limited. The second solution shown in FIG. 3*b* consists in placing the first articulation 6 outside the coverage area. This solution leads to simpler mechanical principles, has no singular point within the coverage zone, but is inferior in terms of mass and overall dimensions. Nevertheless, this latter solution will be chosen in the case where the speeds of displacement of the articulations in the coverage zone have to be high.

In a simple embodiment of the device in accordance with the invention the angles between the axes 6A, 7A of the first and second articulations 6, 7 and the axes 7A, 8A of the second and third articulations 7, 8 may be the same. In this case, if each articulation is able to rotate through 360° and the first articulation 6 is centered on the mean pointing direction within the coverage zone (FIG. 3*a*) the terminal part 11 may be pointed in all directions passing through the virtual rotation center within a cone whose half-angle is twice the angle between two consecutive articulations and with its mean axis being the axis 6A of the first articulation 6.

Figure 4:
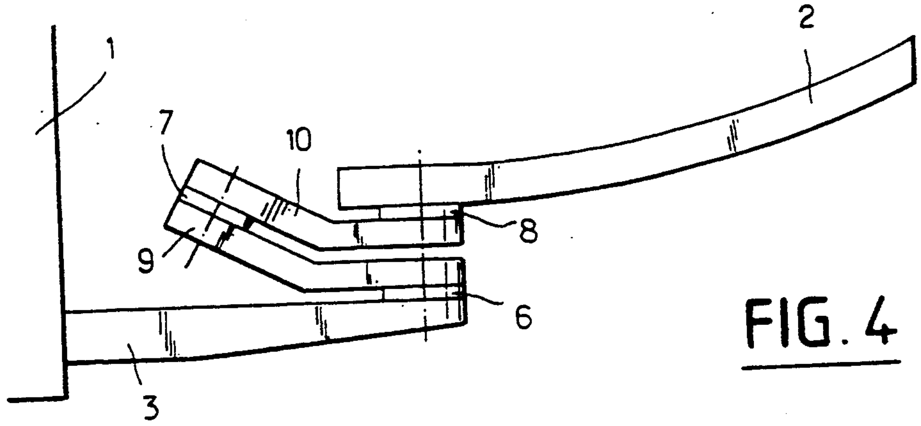
FIG. 4 is a schematic representation of an articulated device in accordance with the invention using articulations having reduced thickness.

In the case of articulations able to pivot freely through 360° it is preferable for the articulations to be of reduced thickness. FIG. 4 shows an articulated device in accordance with the invention having thin articulations. In this design, the articulated arms 9, 10 are bent at their middle and are pivotally mounted at their ends, superposed one on the other, and able to pivot freely through 360°. Use may be made for this type of articulation of "O" configuration oblique contact annular bearings or annular bearings with four points of contact, equipped with an annular electric motor (not shown) for displacing the arms 9, 10 in rotation. In a folded position of the articulated device the second arm 10 is superposed on the first arm 9 and the reflector 2 is superposed on the second arm 10. The arms 9 and 10 are shaped to be parallel over their entire length in the folded position of the articulated device.

Figure 5:
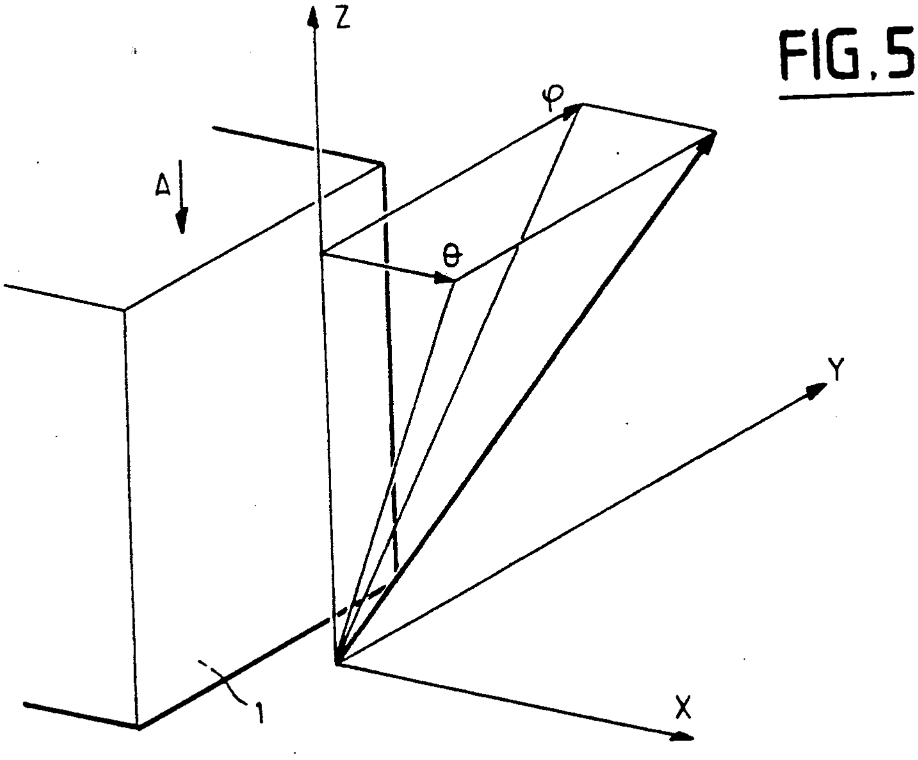
FIG. 5 is a schematic representation of the directions in which the device in accordance with the invention is intended to point.

To point the radio beam radiated by the feed 20 it would be practical to use only the first two articulations 6, 7, the third articulation 8 being used to keep the antenna reflector 2 in the beam from the feed. Let $\omega 1$ denote the angle of rotation of the articulation 6, $\omega 2$ denote the angle of rotation of the articulation 7 and $\omega 3$ denote the angle of rotation of the articulation 8, $\omega 1$, $\omega 2$ and $\omega 3$ being equal to zero when the articulated device is extended. If the angles between the respective axes of two consecutive articulations are the same, this angle is denoted $\alpha$ and the pointing angles of the radio beam are denoted $\theta$ and $\phi$, as can be seen in FIG. 5. The angles $\theta$ and $\phi$ are the two antenna pointing angles in the frame of reference of the satellite 1 that the mechanism in accordance with the invention has to establish to point the beam in a given direction. Specifically, $\theta$ is the beam pointing angle with respect to the OY axis of the antenna and $\phi$ is the beam pointing angle with respect to the OX axis of the antenna, the OX, OY axes of the frame of reference being defined relative to the satellite 1. The following approximate relations can be derived from the various geometrical relationships between these various angles, neglecting projections due to the construction angle $\alpha$:

$$\theta = \alpha(\cos \omega 1 + \cos(\omega 1 + \omega 2))$$

$$\phi = \alpha(\sin \omega 1 + \sin(\omega 1 + \omega 2))$$

The angles $\omega 1$ and $\omega 2$ are simple to determine by means of a computer by supplying to the latter the parameters $\theta$ and $\phi$ for example. The angles $\omega 1$ and $\omega 2$ are then used to control an electronic device for positioning the first two articulations 6, 7, which may be equipped with a stepper motor to achieve a particular pointing direction.

The third articulation 8 preferably holds the direction of the major axis of the antenna reflector 2 as constant as possible during positioning of the satellite 1. This articulation may be passive, unmotorized, its rotation being defined and conditioned by the rotations of the first two articulations 6, 7 by means of an articulation coordination system. In the case of an antenna pointing mechanism the various articulations 6, 7, 8 are positioned as follows:

the first two articulations 6, 7 are positioned according to the respective angles of rotation ω1, ω2 as determined by a computer, for example, to achieve pointing in a given direction, and the third articulation 8 is positioned according to an angle ω3 equal and opposite to the angle of rotation ω1 of the first articulation 6.

Figure 6:
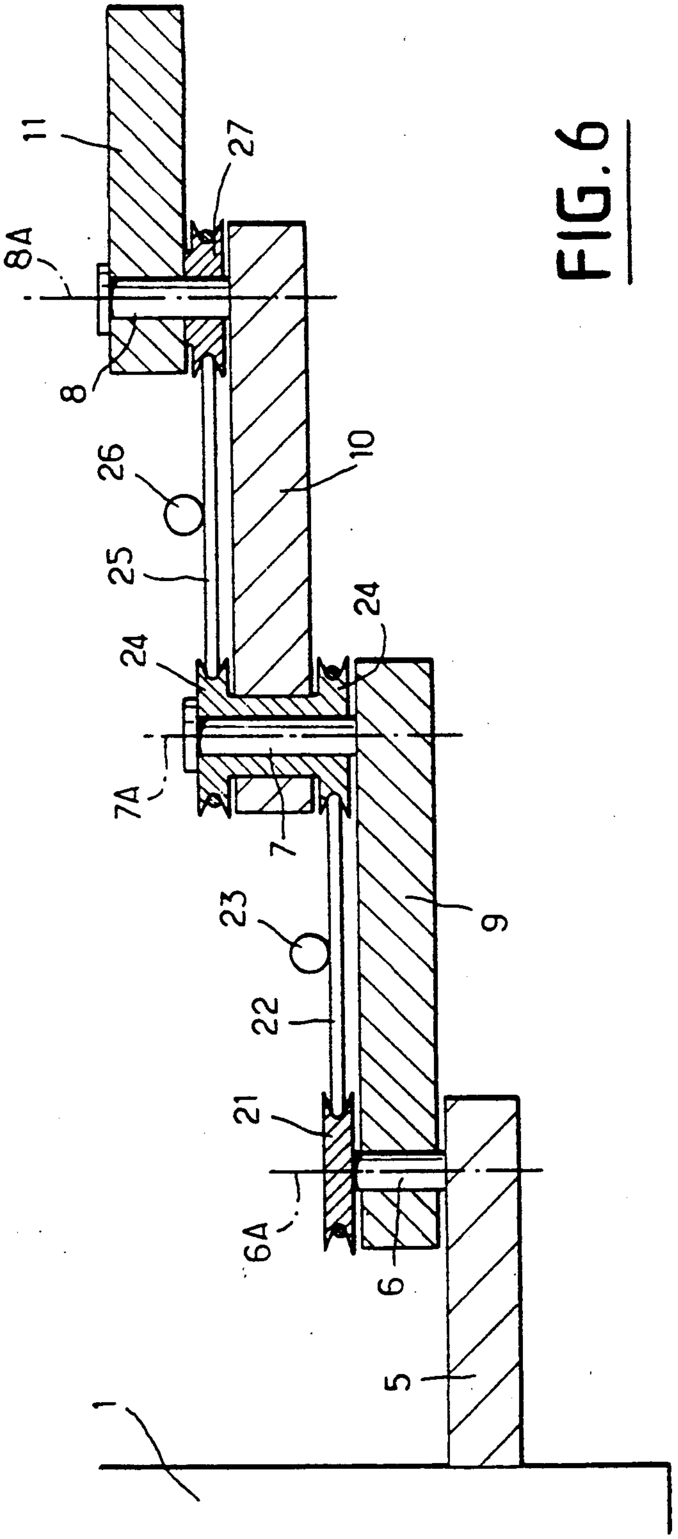
FIG. 6 is a schematic representation of the articulated device in accordance with the invention comprising pulley wheels and belts.

This articulation coordination system can be obtained in a simple way by installing on the articulated device in accordance with the present invention in which the axes 6A, 7A, 8A are shown parallel as can be seen in FIG. 6 a first pulley wheel 21 fixed on the first rotation axis 6A, second and third pulley wheels 24 rotatable about the second rotation axis 7A and fastened together to constitute a double pulley wheel and a fourth pulley wheel 27 rotatable about the third rotation axis 8A and fastened to the terminal part 11. The pulley wheels are coupled and coordinated in pairs by two non-crossed cables, in other words, the pulley wheel 21 is coupled to the double pulley wheel 24 by a first belt 22 and the double pulley wheel 24 is coupled to the pulley wheel 27 by a second belt 25. If the axes 6A, 7A, 8A are at angles depending on the mechanism pointing range, for example 5° for a mechanism having a total pointing range of 10°, with the same angles between axes, the belts 22, 25 are not planar. To overcome this problem use is made of two pairs of secondary pulley wheels 23, 26, each secondary pulley wheel being positioned on the belt run corresponding to the runs formed by the pair of belts 22, 25 in such a way as to correct the planar configuration of the belts by bearing on the respective belt run, preferably substantially centrally of the length of the belt.

Figure 7:
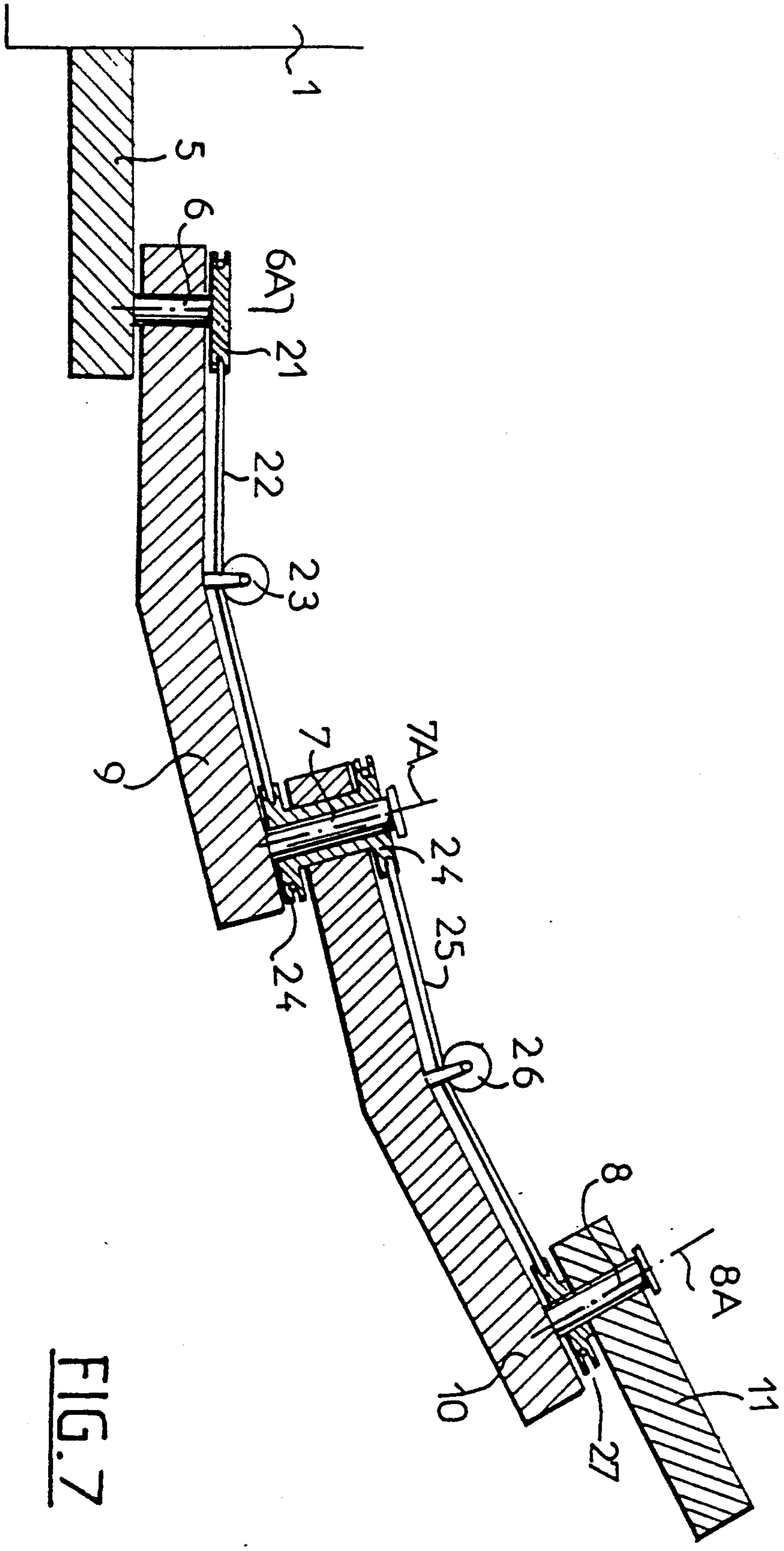

This embodiment of the invention is shown in FIG. 7.

The rotation of the third articulation 8 coordinated with that of the first two articulations 6, 7 adjusts the direction of polarization of the antenna when the reflector 2 is polarized (grid reflector) and places the reflector 2 in such a way as to intercept maximum energy from the feed(s) 20 and to achieve "out of area" pointing directions. In these cases of complex laws of coordination, electronic control and coordination circuitry linked to the computer is necessary.

Of course, other conjugation mechanisms may be employed in place of pulley wheels and belts, for example pairs of tapered gears and torsion arms.

The articulated device in accordance with the invention is particularly useful for pointing radio beams at angles between 5° and 20° and/or for spiral search modes.

In the case of parabolic reflector, data relay satellites it is preferable to employ three identical and independent drive units for each articulation rather than a mechanical conjugation system. Such drive units procure exact conjugation, better modularity and progressive deployment of the articulated device.

The invention is not limited to the examples described and implemented and other embodiments of the invention may be envisaged without departing from the scope of the invention.

There is claimed:

1. An articulated device for moving a first object with respect to a second object, said device comprising:

first and second connecting arms, each of said connecting arms having ends spaced apart along a direction of extension of the respective arm;

said first connecting arm having a first articulation means located at one end thereof, said first connecting arm being coupled to said second object by said first articulation means, said first articulation means having an axis of rotation about which said first connecting arm rotates, said first connecting arm having a second articulation means located at the other end of said first connecting arm; and said second connecting arm having one end coupled to said second articulation means, said second articulation means having an axis of rotation about which said second connecting arm rotates, said second connecting arm having a third articulation means at the other end thereof;

said third articulation means being coupled to said first object, said third articulation means having an axis of rotation about which said first object rotates;

the aforesaid connecting arms and articulation means being formed such when said second connecting arm extends beyond said first connecting arm and is aligned with said first connection arm in the direction of extension of said first connecting arm, the axes of rotation of two of said first, second, and third articulation means are canted with respect to the axis of rotation of the remaining one of said articulation means so that the axes of rotation intersect at a virtual common point remote from said first object.

2. The articulated device according to claim 1 wherein said first object is a parabolic antenna reflector.

3. The articulated device according to claim 2 wherein said axes of rotation are further defined as intersecting at the focus of the parabolic antenna.

4. The articulated device according to claim 2 wherein said second object is a space satellite.

5. The articulated device according to claim 1 wherein said connecting arms and articulation means are formed such that when said second connecting arm extends beyond said first connecting arm and is aligned with said first connecting arm in the direction of extension of said first connecting arm, the angle between the axes of rotation of the first and second articulation means and the angle between the axes of rotation of said second and third articulation means are the same.

6. The articulated device according to claim 1 wherein said first connecting arm is bent along the direction of its extension, wherein said second connecting arm is bent along the direction of its extension, the bends in said connecting arms being generally similar, wherein said second connecting arm is coupled to said second articulation means at a location spaced along the axis of rotation of said second articulation means from said first connecting arm so that said connecting arms may be rotated to a position in which one of said connecting arms is superposed over the other of said connecting arms, and wherein said articulation means rotate through 360°.

7. The articulated device according to claim 1 wherein said articulated device further comprises: a first pulley wheel fixed to said second object and positioned to lie on the axis of rotation of said first articulation means; second and third pulley wheels fastened for rotation together and rotatable about the axis of rotation of said second articulation means; and a fourth pulley wheel rotatable about the axis of rotation of the third articulation means and fastened to a terminal part of said articulated device coupled to said first object, said pulley wheels being coupled in pairs by non-crossed belts extending therebetween.

8. A telecommunications satellite having:

an antenna having a parabolic reflector; and an articulated device for moving said reflector with respect to said satellite, said device comprising:

first and second connecting arms each of said connecting arms having ends spaced apart along a direction of extension of the respective arm;

said first connecting arm having a first articulation means located at one end thereof, said first connecting arm being coupled to said satellite by said first articulation means, said first articulation means having an axis of rotation about which said first connecting arm rotates, said first connecting arm having a second articulation means located at the other end of said first connecting arm;

said second connecting arm having one end coupled to said second articulation means, said second articulation means having an axis of rotation about which said second connecting arm rotates, said second connecting arm having a third articulation means at the other end thereof;

said third articulation means being coupled to said reflector, said third articulation means having an axis of rotation about which said reflector rotates; and the aforesaid connecting arms and articulation means of said device being formed such when said second connecting arm extends beyond said first connecting arm and is aligned with said first connecting arm in the direction of extension of said first connecting arm, said axes of rotation of two of said first, second, and third articulation means are canted with respect to the axis of rotation of the remaining one of said articulation means so that the axes of rotation intersect at a virtual common point located at the focus of the reflector.

9. The satellite according to claim 8 wherein said articulated device further comprises: a first pulley wheel fixed to said satellite and positioned to lie on the axis of rotation of said first articulation means; second and third pulley wheels fastened for rotation together and rotatable about the axis of rotation of said second articulation means; and a fourth pulley wheel rotatable about the axis of rotation of the third articulation means and fastened to a terminal part of said device coupled to said reflector, said pulley wheels being coupled in pairs by non-crossed belts extending therebetween.

10. The satellite according to claim 8 wherein said first and second articulation means rotate 360° and wherein said connecting arms are dimensioned along their directions of extension such as to move said reflector, by rotation of said first and second connecting arms about said first and second articulation means, in an antenna coverage zone which defines a generally circular area when projected on a plane normal to the axis of rotation of said first articulation means and which has as its center the axis of rotation of said first articulation means.

11. The satellite according to claim 8 wherein said first and second articulation means rotate 360° and wherein said connecting arms are dimensioned along their directions of extension such as to move said reflector, by rotation of said first and second connecting arms about said first and second articulation means, in an antenna coverage zone which defines a generally circular area when projected on a plane normal to the axis of rotation of said first articulation means and which does not intersect the axis of rotation of said first articulation means.

12. The satellite according to claim 8 wherein said connecting arms and articulation means are formed such that when said second connecting arm extends beyond said first connecting arm and is aligned with said first connecting arm in the direction of extension of said first connecting arm, the angle between the axes of rotation of said first and second articulation means and the angle between the axes of rotation of said second and third articulation means are the same.

13. The satellite according to claim 10 wherein said connecting arms and articulation means are formed such that when said second connecting arm extends beyond said first connecting arm and is aligned with said first connecting arm in the direction of extension of said first connecting arm, the angle between the axes of rotation of said first and second articulation means and the angle between the axes of rotation of said second and third articulation means are the same.

14. The satellite according to claim 8 wherein said first connecting arm is bent along the direction of its extension, wherein said second connecting arm is bent along the direction of its extension the bends in said connecting arms being generally similar, wherein said second connecting arm is coupled to said second articulation means at a location spaced along the axis of rotation of said second articulation means from said first connecting arm so that said connecting arms may be rotated to a position in which one of said connecting arms is superposed over the other of said connecting arms, and wherein said articulation means rotate through 360°.

15. A method of pointing a parabolic antenna of a satellite, said antenna having at least one parabolic reflector and an articulated device for moving said reflector with respect to said satellite, said device comprising: first and second connecting arms, each of said connecting arms having ends spaced apart along a direction of extension of the respective arm; said first connecting arm having a first articulation means located at one end thereof, said first connecting arm being coupled to said satellite by said first articulation means, said first articulation means having an axis of rotation about which said first connecting arm rotates, said first connecting arm having a second articulation means located at the other end of said first connecting arm; said second connecting arm having one end coupled to said second articulation means, said second articulation means having an axis of rotation about which said second connecting arm rotates, said second connecting arm having a third articulation means at the other end thereof; said third articulation means being coupled to said reflector, said third articulation means having an axis of rotation about which said reflector rotates; and the aforesaid connecting arms and articulation means being formed such when said second connecting arm extends beyond said first connecting arm and is aligned with said first connecting arm in the direction of extension of said first connecting arm, sides of rotation of two of said first, second and third articulation means are canted with respect to the axis of rotation of the remaining one of said articulation means so that the axes of rotation intersect at a virtual common point located at the focus of the reflector, said method comprising the steps of:

positioning the first and second articulation means with respective rotation angles to procure pointing of the antenna in a given direction; and positioning the third articulation means with a rotation angle equal and opposite to the rotation angle of the second articulation means.

* * * * *

UNITED STATES PATENT AND TRADEMARK OFFICE
CERTIFICATE OF CORRECTION

PATENT NO. : 5,091,733

DATED : February 25, 1992

INVENTOR(S) : Gilles LaBruyere

It is certified that error appears in the above-identified patent and that said Letters Patent is hereby corrected as shown below:

CLAIM 1, Col. 6, Line 28, delete "connection" and substitute therefor ---connecting---; CLAIM 3, Col. 6, Line 40, after "antenna" insert ---reflector---; CLAIM 14, Col. 8, Line 31, after "extension" insert ---,---; CLAIM 15, Col. 8, Line 67, delete "sides" and substitute therefor ---said axis---

Signed and Sealed this

Twelfth Day of October, 1993

*Attest:*

BRUCE LEHMAN

*Attesting Officer* *Commissioner of Patents and Trademarks*